United States Patent [19]
Eastman et al.

[11] Patent Number: 5,436,880
[45] Date of Patent: Jul. 25, 1995

[54] LASER POWER CONTROL IN AN OPTICAL RECORDING SYSTEM USING PARTIAL CORRECTION OF REFLECTED SIGNAL ERROR

[75] Inventors: Clarke K. Eastman, Rochester; Gerald J. Smart, Penfield; Peter J. Spyra, Churchville, all of N.Y.

[73] Assignee: Eastman Kodak Company, Rochester, N.Y.

[21] Appl. No.: 179,476

[22] Filed: Jan. 10, 1994

[51] Int. Cl.⁶ .............................................. G11B 7/00
[52] U.S. Cl. ........................ 369/54; 369/116; 369/53; 369/44.29; 369/44.32; 369/44.36
[58] Field of Search .............. 369/54, 58, 53, 116, 369/120, 121, 44.11, 44.25, 44.29, 44.28, 44.32, 44.34, 44.35, 44.36, 44.41, 47, 48, 32; 250/201.5

[56] References Cited

U.S. PATENT DOCUMENTS

| | | | |
|---|---|---|---|
| 4,475,182 | 10/1984 | Hosaka | 250/201.5 X |
| 4,482,989 | 11/1984 | Bierhoff | 250/201.5 X |
| 4,554,653 | 11/1985 | Malissin et al. | 369/32 X |
| 4,637,005 | 1/1987 | Naito et al. | 250/201.5 X |
| 4,742,505 | 5/1988 | Takeuchi et al. | 369/116 X |
| 4,878,211 | 10/1989 | Suzuki et al. | 369/54 X |
| 4,890,273 | 12/1989 | Takeuchi et al. | 369/58 X |
| 4,942,564 | 7/1990 | Hofer et al. | 369/58 |
| 4,967,404 | 10/1990 | Orlicki et al. | 369/44.11 |
| 5,001,690 | 3/1991 | Kamiya et al. | 369/44.32 |
| 5,004,311 | 4/1991 | Peppers | 359/220 X |
| 5,005,163 | 4/1991 | Yamamoto et al. | 369/44.36 |
| 5,010,535 | 4/1991 | Davis | 369/32 |
| 5,014,256 | 5/1991 | Horie et al. | 369/44.35 |
| 5,026,981 | 6/1991 | Yamane et al. | 250/214 |
| 5,050,149 | 9/1991 | Ishii et al. | 369/43 |
| 5,107,101 | 4/1992 | Ando | 250/201.5 |
| 5,121,374 | 6/1992 | Barton et al. | 369/44.29 |
| 5,124,964 | 6/1992 | Hayashi | 369/44.11 |
| 5,146,443 | 9/1992 | Iwase et al. | 369/44.29 |
| 5,150,345 | 9/1992 | Shikichi et al. | 369/44.34 |
| 5,199,015 | 3/1993 | Edahiro et al. | 369/44.25 |
| 5,210,732 | 5/1993 | Suenaga et al. | 269/44.29 |
| 5,216,649 | 6/1993 | Koike et al. | 369/44.23 |

OTHER PUBLICATIONS

Philips CDD521 Professional Compact Disc Recorder Service Manual, published by Service & Support Interactive Media Systems, Netherlands.

*Primary Examiner*—Georgia Y. Epps
*Assistant Examiner*—Muhammad N. Edun
*Attorney, Agent, or Firm*—Raymond L. Owens

[57] ABSTRACT

The present invention provides an apparatus and method for controlling laser power in an optical recording system. A recording system in accordance with the present invention includes an optical source for supplying an incident write signal to an optical medium, such that data may be recorded on the medium during an incident write pulse as a mark having a distinct reflectivity; a detector for detecting a reflection the incident write signal from the medium to provide a reflected write signal; a generator for generating a mark formation effectiveness signal from a reflected write pulse in the reflected write signal, to provide an indication of the quality of the mark; an error signal generator for generating an error signal from the mark formation effectiveness signal and a target value of the mark formation effectiveness signal; and a controller for controlling a write power level of the optical source by providing a partial correction of variation in the error signal. The quality of data recorded in the presence of certain types of system degradations, such as laser defocus and optical media tilt, is improved. The present invention also provides techniques for determining write power control voltage and error signal voltage limits, and updating the limits using an incident write signal optical detector.

20 Claims, 8 Drawing Sheets

LASER POWER CONTROL IN AN OPTICAL RECORDING SYSTEM USING PARTIAL CORRECTION OF REFLECTED SIGNAL ERROR

CROSS REFERENCE TO RELATED APPLICATIONS

The present invention is related to the following U.S. Patent applications: "Write Verification in an Optical Recording System By Sensing Mark Formation While Writing", Ser. No. 08/179,472, "Laser Power Control in an Optical Recording System to Compensate For Multiple System Degradations", Ser. No. 08/179,394; "Method and Apparatus For Focusing A Recording Light Beam On A Recording Medium," Ser. No. 08/179,477; and "Method And Apparatus For Maintaining A Recording Light Beam In An On-Track Position On A Recording Medium," Ser. No. 08/179,474, all filed concurrently with the present application, assigned to the assignee of the present invention, the disclosures of which are incorporated herein by reference.

FIELD OF THE INVENTION

The present invention relates to optical data recording. More particularly, the present invention relates to an improved optical recording system and method which uses a reflected optical write signal to control optical source power.

DESCRIPTION OF THE PRIOR ART

In optical data recording, an optical source, typically a laser, generates a write signal which is used to record data on an optical medium. To ensure proper data recording, it is important to maintain the laser output at an appropriate power level. A commonly-used technique for determining an initial optimal laser write power involves allocating a section of a recordable medium, such as a recordable compact disk (CD), for power calibration measurements. Several practice recordings are made in this section using a range of laser powers. The practice recordings are read back, and the write power level which produced the best recording quality is selected as optimal. The optimal power level is then used to record actual data in other sections of the CD.

In most recording systems, however, the optimal write power will not remain constant, but will instead need to be adjusted as various system parameters fluctuate with, for example, time or temperature. One technique for continuously maintaining an optimal write power involves monitoring a reflection of the write signal from the medium while data is being recorded. Systems which monitor the reflected write signal may be generally referred to as direct read during write (DRDW) systems. Certain characteristics of the reflected write signal, including, for example, the reflected signal peak voltage level, indicate the quality of the mark formed, and can therefore be used to determine if the laser write power level needs to be adjusted. These reflected signal characteristics, as well as any estimates or transformations thereof, will be generally referred to herein as mark formation effectiveness (MFE) signals. During calibration, an optimal value of an MFE signal can be determined, and a servo loop may be used during actual data recording to adjust the laser write power when the MFE signal deviates from the optimal, or target, value. A version of this technique is utilized in, for example, the CDD521 optical disk writer, manufactured by Phillips Corporation.

Currently available laser power control techniques, however, suffer from a number of significant drawbacks. For example, existing systems, such as the Phillips CDD521, typically use a servo loop to maintain an MFE signal at a predetermined target value despite any recording system degradations. However, optimal control of laser power in the presence of certain types of system degradations, such as laser focus error and tilt, may require an adjustment in the MFE target value.

Another problem is that available techniques do not adequately limit the contribution to total laser write power from, for example, an MFE servo loop. Prior art systems generally use a fixed laser current limiter to prevent the laser from exceeding its maximum rated output power. However, the current-power relationship for the laser often changes as a function of time and temperature, and therefore a fixed laser current limit does not always accurately reflect the maximum safe laser power.

In addition, the type of reflected signal characteristics currently used to control laser power in DRDW systems do not provide a sufficiently flexible and reliable indication of proper mark formation. The above-cited U.S. Patent application No. 08/179,472, identifies a number of problems with the reflected signal characteristics used in existing DRDW systems. These problems include, for example, improper normalization resulting in sensitivity to effects unrelated to mark formation, sensitivity to the type of optical media used, the need to maintain precise sample timing relative to the reflected pulse rising edge, and limited recording system write speed.

As is apparent from the above, existing laser power control techniques, which attempt to maintain a constant MFE signal despite any recording system degradations, are inadequate. In addition, changes in the laser current-power relationship are not taken into account in limiting the total laser power. Furthermore, the MFE signal currently used are overly sensitive to reflected signal magnitude, media type, sample timing, and write speed, as well as other system parameters.

SUMMARY OF THE INVENTION

The present invention provides an apparatus and method for controlling optical source power in an optical recording system. The recording system of the present invention provides improved recorded data quality in part by utilizing a partial correction of an MFE error signal for optical source power control.

In accordance with one aspect of the present invention, a recording system is provided which includes an optical source for supplying an incident write signal to an optical medium, such that data may be recorded on the medium during an incident write pulse as a mark having a distinct reflectivity; means for detecting a reflection of the incident write signal from the medium to provide a reflected write signal; means for generating a mark formation effectiveness signal from a reflected write pulse in the reflected write signal, to provide an indication of the quality of the mark; means for generating an error signal from the mark formation effectiveness signal and a target value of said mark formation effectiveness signal; and means for controlling a write power level of the optical source by providing a partial correction of the error signal.

ADVANTAGES

As a feature of the present invention, in the presence of certain system degradations, such as laser defocus and tilt, a partial correction of MFE signal error results in fewer recorded data errors than prior art power control techniques which hold either laser power or an MFE signal constant. The partial error correction may be provided using, for example, a variable gain servo loop operating on an MFE error signal. The variable gain may be set using the response of a particular optical medium during write calibration. Alternatively, partial correction may be implemented by restricting the MFE signal to a range of acceptable values near the MFE target value.

As another feature of the present invention, a variable voltage limiter is provided for limiting the contribution to total laser power of, for example, an MFE servo loop. The voltage limit may be updated when, for example, the laser current-power relationship changes. The total laser power can thereby be directly and accurately controlled, and the danger of damaging the laser is minimized.

As an additional feature of the present invention, improved laser power control may be provided using an MFE signal which measures the normalized rate of change of the reflected write signal during mark formation. The laser power control techniques of the present invention are therefore less sensitive to changes in a variety of system parameters, such as reflected signal magnitude, media type, sample timing, or write speed.

Further features of the invention, its nature and various advantages will become more apparent from the accompanying drawings and following detailed description of the invention.

DETAILED DESCRIPTION OF THE PREFERRED EMBODIMENT

Data is generally recorded on an optical medium, such as a recordable compact disk (CD), in the form of marks. A mark, also known as a pit, has a different reflectivity than the unmarked portions of the disk, or lands, and is formed using a write signal power level sufficient to alter the reflectivity of the medium. The marks and lands represent different binary logic levels within the recording data. In general, certain characteristics of the reflected write signal indicate whether or not the mark has been properly formed, or, in other words, whether the data has been properly recorded on the medium. The reflected write signal can therefore be used to control laser power based upon whether marks are being properly formed.

Figure 1:
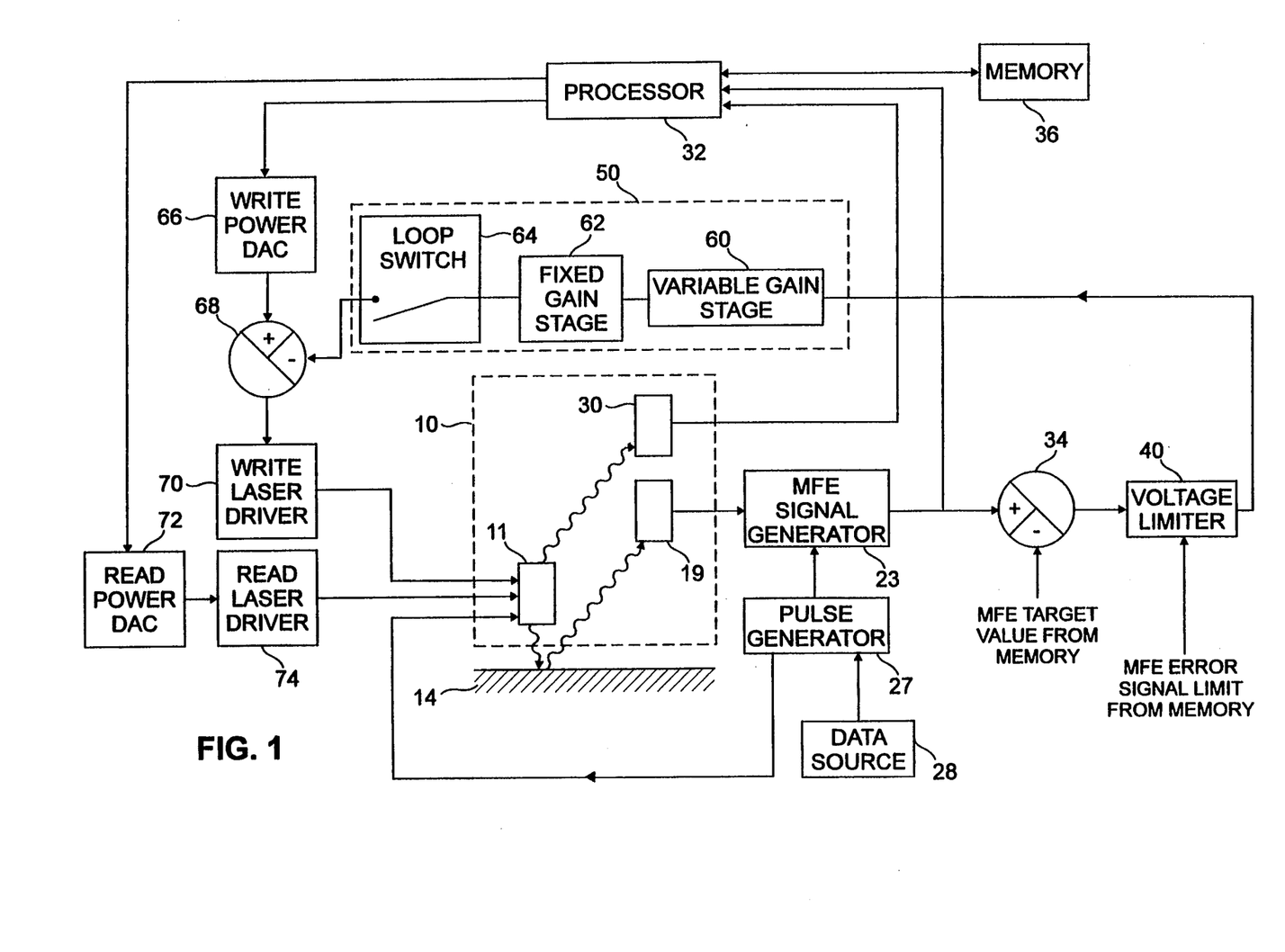
FIG. 1 is a block diagram of an exemplary optical recording system with laser power control in accordance with the present invention.

FIG. 1 is a block diagram of an exemplary optical recording system in accordance with the present invention. The recording system includes an optical head 10 for supplying an incident optical write signal used to record data on an optical recording medium 14. The optical head 10 includes an optical source 11 for generating the incident write signal. The optical source 11 may include, for example, a laser diode and a controller, and may be referred to herein simply as a laser. It should be understood, however, that the techniques of the present invention may be used with many other types of optical sources. The optical source 11 may be intensity-modulated by a stream of recording data, such as digital audio, video or other information suitably encoded to facilitate recording on the optical medium. An exemplary data encoding technique well-known in the art is the eight-to-fourteen bit modulation (EFM) code used in CD recording. The optical medium 14 may be a recordable optical CD or any other suitable optical recording medium.

The optical write signal incident on optical medium 14 is reflected back from the medium toward an optical detector 19. The reflected signal may also be directed to additional optical detectors, not shown, which may drive, for example, focussing or tracking adjustment circuitry. The optical detector 19 may include a number of photodetectors for detecting the reflected optical signal and generating electrical signals therefrom in a known manner. Exemplary photodetectors suitable for use in the present invention include positive-intrinsic-negative (PIN) photodiodes and avalanche photodiodes. In systems operating at high write speeds, such as 6× or higher, the photodetectors may require response times on the order of several nanoseconds. A system write speed of 6× corresponds to six times the standard 4.32 Mbits/sec playback speed of an audio CD. The electrical signal at the output of optical detector 19 tracks the intensity modulation of the reflected optical write signal. The electrical signal generated by the optical detector 19 represents a reflected write signal which may be processed in subsequent electronic circuitry. The term "reflected write signal" as used herein will generally refer to the electrical signal at the output of the optical detector 19, rather than the optical signal at the detector input. The reflected write signal includes at least one reflected write pulse, corresponding to an incident pulse in the incident optical write signal.

A mark formation effectiveness (MFE) signal generator 23 receives the reflected write signal from the optical detector 19 and generates, for example, an MFE signal which varies with the reflected write pulse normalized decay rate in a manner to be discussed in greater detail in conjunction with FIGS. 7 to 10. Other reflected signal characteristics may also be used as MFE signals in accordance with the present invention. As used herein, the term "rate of change" refers generally to the change in reflected write pulse voltage as a function of time. The term "decay rate" will be used herein to refer to a type of rate of change, characteristic of certain optical media, in which the reflected write pulse voltage decays from an initial peak value to a lower value, such as a steady-state plateau, during mark formation. The reflected pulse decay rate is only one type of reflected signal characteristic which may be used in accordance with the present invention to control laser write power by providing an indication of proper mark formation on the medium. Any of a number of other reflected signal characteristics may also be used as MFE signals in accordance with the present invention.

The pulse generator 27 receives a stream of data from a data source 28 and supplies suitably encoded recording data, in the form of a stream of write pulses, to optical source 11. The pulse generator 27 may also use the data stream from data source 28 to generate reference pulses for the MFE signal generator 23. The pulse generator 27 thus, serves both as an interface between the data source 28 and the optical source 11, and as a reference pulse source for the MFE signal generator. In other embodiments, the data source 28 could directly drive the optical source 11, and the reference pulse generation function could be included within the MFE signal generator 23.

A portion of the incident write signal is supplied directly from optical source 11 to a front facet monitor (FFM) 30. The FFM 30 is an optical detector which monitors the incident write signal power level. The FFM 30 provides an output voltage which varies with the output power of the optical source. The FFM output voltage may be sampled between write pulses in recording system processor 32, and used, for example, to control a read power level. The FFM 30 may also be used to calibrate the optical source output power level as a function of its input drive, in a manner to be discussed in greater detail below. The MFE signal generator 23 supplies an output MFE signal to a signal combiner 34 which measures the difference between the actual MFE signal and an optimal, or target, MFE signal value stored in a system memory 36. The difference between the actual and the target MFE signal values will be referred to herein as the MFE error signal. The output MFE signal may also be sampled in processor 32 and supplied to the memory 36 for storage. For example, during the above-described laser power calibration process, in which practice data recordings are made in one section of the recording medium in order to determine an initial optimal laser power, the MFE signals corresponding to various trial write powers may be stored in the memory 36. The target MFE signal value is determined from the MFE signals for the different laser power levels and measurements of resulting data quality, and then stored in the memory 36.

The MFE error signal produced at an output of the signal combiner 34 then passes through a voltage limiter 40. The voltage limiter 40 limits the contribution to total laser output power from the MFE error signal feedback in a manner to be described in greater detail below in conjunction with FIGS. 5 and 6. In general, a maximum value, or limit, for the MFE error signal may be stored within the memory 36, and is used to control the operation of the limiter 40 such that its output does not exceed the stored maximum value. As a result, the laser peak output power will not be driven above a recommended maximum by the fedback MFE error signal.

The output of the voltage limiter 40 is supplied to a feedback circuit 50 in a servo loop which uses the MFE error signal, as limited by voltage limiter 40, to control optical source power. The feedback circuit 50 includes a variable gain stage 60, a fixed gain stage 62, and a loop switch 64. The variable gain stage 60 may be a multiplying digital-to-analog convertor (DAC) configured in a known manner to operate as a variable attenuator. An exemplary multiplying DAC is the Model No. AD7628 DAC, available from Analog Devices. Other types of a variable attenuators may also be used for the variable gain stage 60. As another alternative, the fixed gain stage 62 may be eliminated and the entire loop gain supplied by the variable gain stage 60. In general, the variable gain stage 60 and the fixed gain stage 62 together provide a variable loop gain for the MFE error signal servo loop. The variable and fixed gain stages should, in combination with the media response G1 defined below, be capable of providing loop gains in a suitable range, such as, for example, loop gains from about +0.5 to +10.0. It should also be understood, however, that the appropriate loop gain value will typically vary depending upon, for example, the type of system degradation, and therefore values outside this range may be necessary in a given application. The loop switch 64 may be in an open position during, for example, write power level calibration. The loop switch is placed in a closed position during normal system operation, when the laser power is continuously controlled using an MFE signal such as normalized decay rate.

The write power for the optical source 11 is determined in part by a write control voltage generated by a write power DAC 66. The write power DAC controls a write laser driver 70. The output of the write laser driver 70 is provided to optical source 11, along with the output of a read laser driver 74 generated in response to a read control voltage from a read power DAC 72. The optical source also receives recording data, in the form of a series of write pulses, from the pulse generator 27. The optical source 11 generates an incident optical write signal including a number of incident write pulses suitable for recording data on the optical medium 14. Both the write power and read power DACS 66, 72, respectively, may be controlled by processor 32 using, for example, write and read control voltage values stored in the system memory 36. A nominal write control voltage is typically determined during write calibration and an appropriate read control voltage level may be determined by sampling the FFM 30 between write pulses.

During normal system operation, loop switch 64 is closed and the laser read and write power levels are controlled by the fed-back MFE error signal. When loop switch 64 is closed, the MFE error signal is amplified by the variable system loop gain provided by variable gain stage 60 in combination with fixed gain stage 62, and is then supplied to the signal combiner 68. The signal combiner 68 corrects the voltage generated by write power DAC 66 using the scaled MFE error signal, and the corrected voltage value is used to control the write laser driver 70. The write laser driver 70 then supplies an electrical signal to optical source 11 which is a function of the sum of the write DAC control voltage and the scaled MFE error signal. The servo loop operates continuously to provide changes in the optical source write power level which tend to reduce the magnitude of the MFE error signal.

Figure 2A:
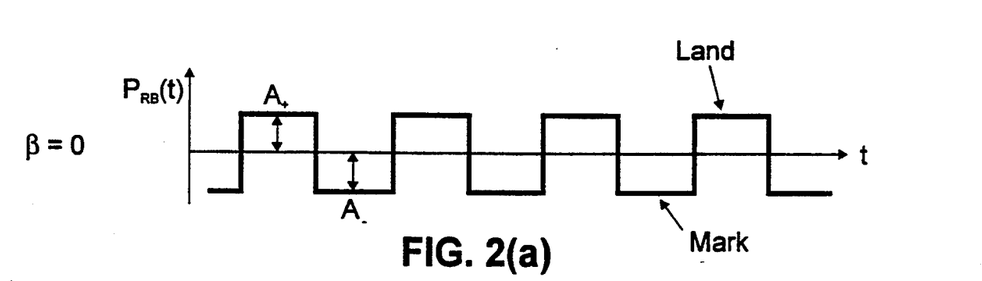
FIGS. 2(a) to 2(c) show exemplary read back signals used to measure the quality of corresponding recorded data.
Figure 2B:
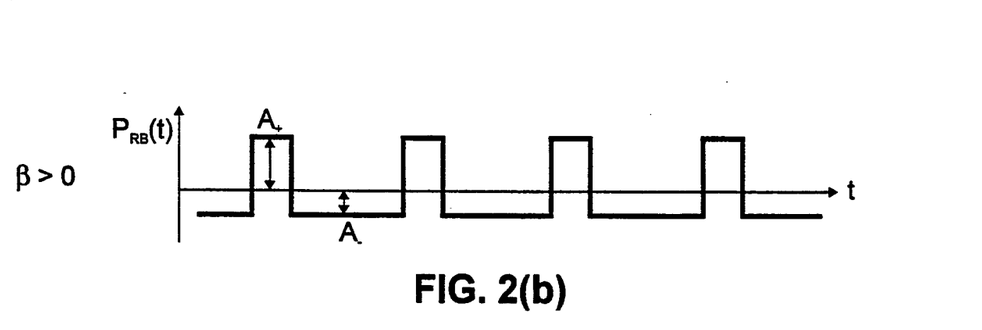
Figure 2C:
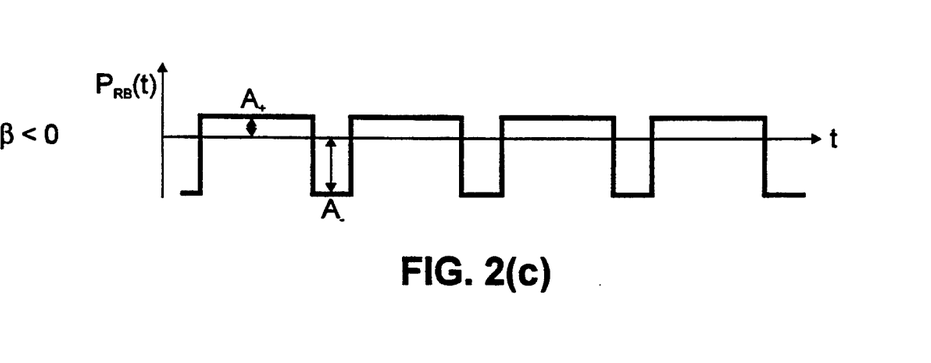

FIGS. 2(a)-(c) illustrate a measure of recorded data quality commonly referred to as beta, or simply "$\beta$". $\beta$ measures recorded mark length error by comparing positive and negative peaks of an AC-coupled readback waveform. In FIG. 2(a), an optimal readback waveform $P_{RB}(t)$ is shown. The readback waveform $P_{RB}(t)$ represents the reflection of a constant power incident read signal from an optical medium on which data has been recorded in the form of marks and lands. The length of the marks relative to the lands will determine the amplitudes of positive and negative waveform peaks relative to an average voltage of the waveform. In FIGS. 2(a)-(c), the horizontal axis corresponds to the average voltage of the waveform. $\beta$ is a measure of how far the positive and negative peaks deviate from the average AC-coupled waveform voltage. The average voltage of the AC-coupled waveform may correspond to, for example, ground potential. The value of $\beta$ is given by:

$$\beta = \frac{|A_+| - |A_-|}{|A_+| + |A_-|},$$

in which positive peak $|A_+|$ is the absolute value of difference between the waveform voltage corresponding to a land and the average waveform voltage, while negative peak $|A_-|$ is the difference between the waveform voltage corresponding to a mark and the average voltage. In FIG. 2(a), which corresponds to marks having a proper length, the values of $|A_+|$ and $|A_-|$ are equivalent and $\beta$ is therefore zero. FIG. 2(b) shows a playback waveform in which the mark length is longer than the lands, due to, for example, an improper optical source power during recording. The value of $|A_+|$ is therefore greater than the value of $|A_-|$, and $\beta$ is positive. FIG. 2(c) shows a readback waveform in which improper mark formation has caused the marks to be shorter than the lands. The value of $|A_+|$ is therefore less than the value of $|A_-|$, and $\beta$ is negative. Proper mark formation typically corresponds to a $\beta$ value of zero, and therefore the effectiveness of laser power control techniques may be compared by examining resulting $\beta$ values.

Figure 3A:
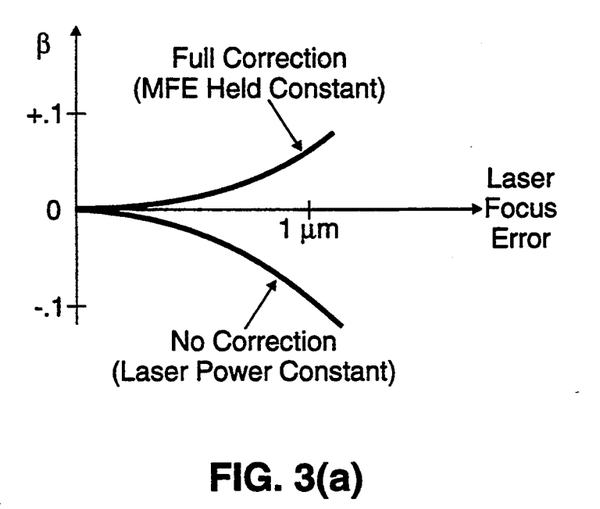
FIG. 3(a) is a plot of beta, a measure of recorded mark quality, as a function of laser focus error for prior art laser power control techniques which maintain either an MFE signal or laser power constant.

FIG. 3(a) compares $\beta$ values resulting from no correction and full correction of MFE error in the presence of various amounts of laser defocus during recording. The lower curve, corresponding to no correction, represents $\beta$ values obtained by reading back data recorded at a constant laser power in the presence of laser defocus. The negative $\beta$ values indicate that the marks formed were shorter than the lands, and laser power was therefore too low. Prior art techniques which use no correction, or maintain laser power at a constant level, therefore fail to provide proper laser power in the presence of laser defocus. The upper curve corresponds to the full correction of MFE error used in certain prior art systems. The upper curve $\beta$ values are obtained by reading back data recorded at a laser power controlled to maintain an MFE signal at a target value. The resulting curve shows positive values of $\beta$, indicating that the marks were longer than the lands. Prior art techniques which utilize full correction of MFE error thus overcompensate for the decrease in illuminated spot intensity caused by laser defocus.

Figure 3B:
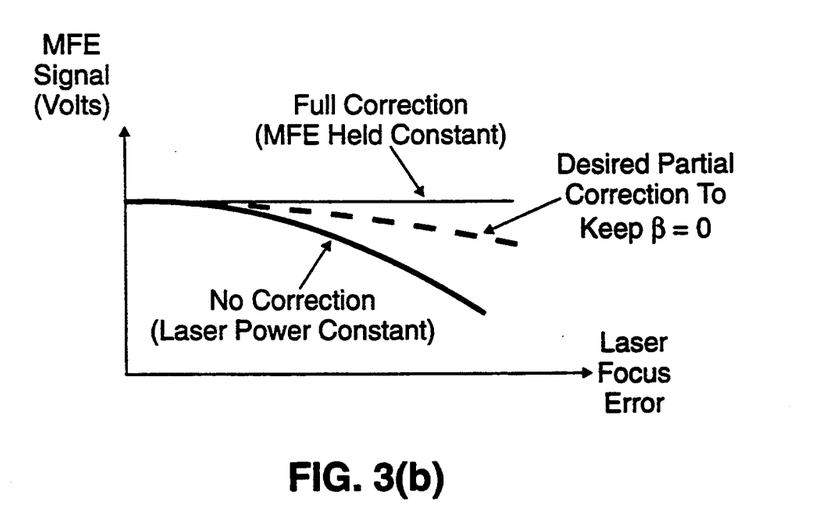
FIG. 3(b) is a plot of MFE signal variation as a function of laser focus error for various laser power control techniques.

FIG. 3(b) shows MFE signal curves corresponding to the $\beta$ curves of FIG. 3(a). Full correction of MFE signal error results in a flat MFE signal curve as a function of laser defocus. The lower curve shows the change in MFE signal as a function of laser defocus when laser power is held constant. The dotted curve corresponds to an MFE signal variation which will provide an optimal $\beta$ value of zero in the presence of varying amounts of laser defocus. Partial correction of MFE error in accordance with the present invention can provide this desired MFE signal variation. One partial correction technique involves using a variable gain servo loop, such as that shown in FIG. 1.

An exemplary technique for determining a variable servo gain in accordance with the present invention will now be described. As noted above, prior art systems which use a reflected write signal characteristic to control laser power are typically designed to maintain the reflected write signal characteristic at a predetermined target value. This may be done in, for example, a high gain servo loop, as will be explained in greater detail below. The present invention, however, provides a partial correction of a reflected signal characteristic error which reduces errors in written data when recording in the presence of certain system degradations, such as laser defocus. An exemplary means for providing such a partial correction is a variable gain servo. The manner in which the variable gain is determined is as follows.

During write calibration, as described above, several different trial laser power levels are used to write practice data to a certain section of, for example, a recordable CD. The use of multiple optical source power levels in effect simulates degradations in a variety of different system parameters which affect mark formation. MFE signals are stored in memory 36 for each of the different trial write power levels. The resulting change in the MFE signal for a unit change in write control voltage is referred to herein as the media response G1. The media response G1 represents the gain of a signal path from the input of the write laser driver 70 to the output of the MFE signal generator 23, and will generally vary depending upon the type of optical media used within the system. The media response G1, as measured during write calibration, will be used to determine the appropriate gain for the servo loop.

The variable gain provided by the variable gain stage 60 in conjunction with the fixed gain stage 62 will be referred to herein as the gain G2. The total open loop gain G for the laser power control system, during laser power calibration, is then given by the product of the media response G1 and the variable gain G2, or $$G = G1 \times G2.$$

During actual data recording, when the loop switch 64 is closed, the resulting MFE error signal for a given amount of simulated perturbation is given by:

$$MFE_c = MFE_o/(1+G)$$

where $MFE_c$ is the closed loop MFE error signal, and $MFE_o$ is the open loop MFE error signal which would have resulted if the same system perturbation had occurred with the loop open. In order to maintain loop stability, the value of G should be positive. The ratio of $MFE_c$ to $MFE_o$ is the quantity $1/(1+G)$, referred to herein as residual error.

The variable gain G2 is then set by determining the total loop gain G required to provide a desired amount of partial correction, or residual error. The present invention thus recognizes that optimal power control for all types of system degradations is not achieved by maintaining the MFE signal at a constant value by, for example, using a high value of G such that the residual error is very small. Improved recorded data quality can be provided using a partial correction based upon the MFE signal. A reduced gain servo loop is one way to achieve this partial correction. A variable gain feature allows this reduced gain to be achieved accurately for a variety of recording media. A desired amount of variable gain G2 is determined by solving the equation $G = G1 \times G2$ for G2 using the desired amount of residual error, corresponding to the quantity $1/(1+G)$, and the media response G1 measured during laser write power calibration.

An exemplary amount of partial correction suitable for use with recordable CD media involves setting G to a value of 1.5, such that the quantity $1/(1+G)$ yields a residual error value of 0.4. It has been determined that this amount of partial correction will provide improved quality of recorded data when recording in the presence of system degradations such as laser defocus, as compared to the full correction or constant laser power used in prior art techniques. In general, the desired amount of partial correction will vary depending upon the type of system degradations which must be controlled. For example, to provide optimal power control in the presence of system degradations such as surface contamination, a value of G greater than 1.5 may be preferable. An appropriate amount of partial correction for optimal power control in the presence of other types of system degradations may be determined experimentally.

As noted above, the value calculated for the variable gain G2 will generally vary depending upon the recording system and optical medium used, as a result of differences in the media response measurements. Actual system degradations such as laser defocus or obscuration, which occur during normal system operation, will generally occur within the portion of the system corresponding to the media response G1. As a result, the servo loop will provide the proper amount of partial correction to control the laser power. Once a desired amount of residual error is determined for a certain type of system degradation, the same partial correction may be used in other recording system/optical media combinations. The present invention measures the particular media response for a given system/medium combination, and uses this measurement to determine the variable gain required to achieve a desired amount of partial correction.

Figure 4A:
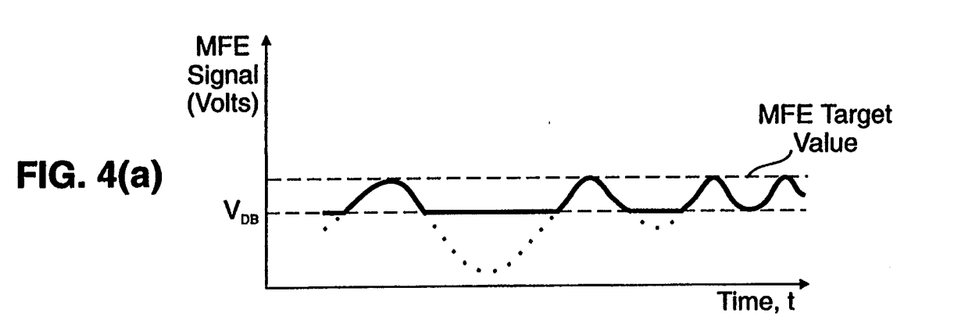
FIG. 4(a) is a plot of exemplary MFE signal variations as a function of time, illustrating deadband partial correction in accordance with the present invention.

An alternative technique for providing partial MFE error correction in accordance with the present invention involves the use of a "deadband" to restrict MFE signal values. FIG. 4(a) shows an exemplary plot of MFE signal variations, as a function of time, in the presence of laser focus error, with deadband partial correction. It should be noted that laser defocus, also referred to herein as focus error, may result in either high frequency or low frequency variations in the MFE signal. High frequency, or AC, defocus involves focus variations around an in-focus condition, and may be referred to herein as simply focus error. AC defocus may be due to, for example, system vibrations. DC defocus, which produces low frequency MFE signal variations, involves an offset from an in-focus condition. DC defocus is typically corrected using a focus error servo technique, such as that described in the above-cited U.S. Patent application No. 08/179,477. The focus error shown in FIG. 4(a) is a type of AC laser focus error.

Figure 4B:
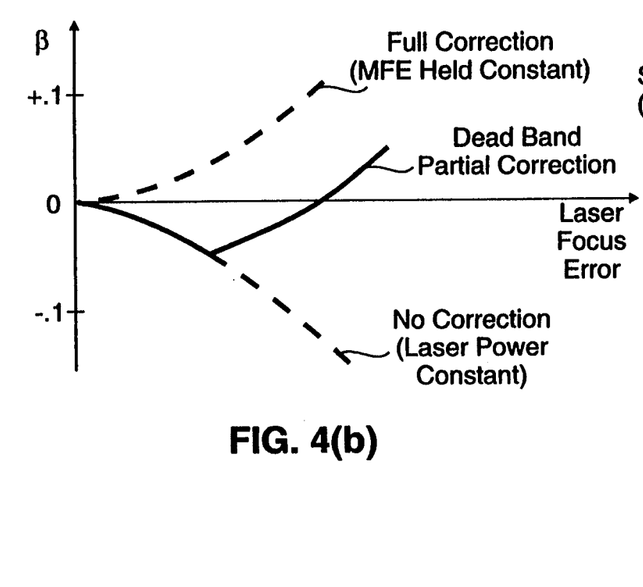
FIG. 4(b) is a plot of beta as a function of laser focus error illustrating deadband partial correction.
Figure 4C:
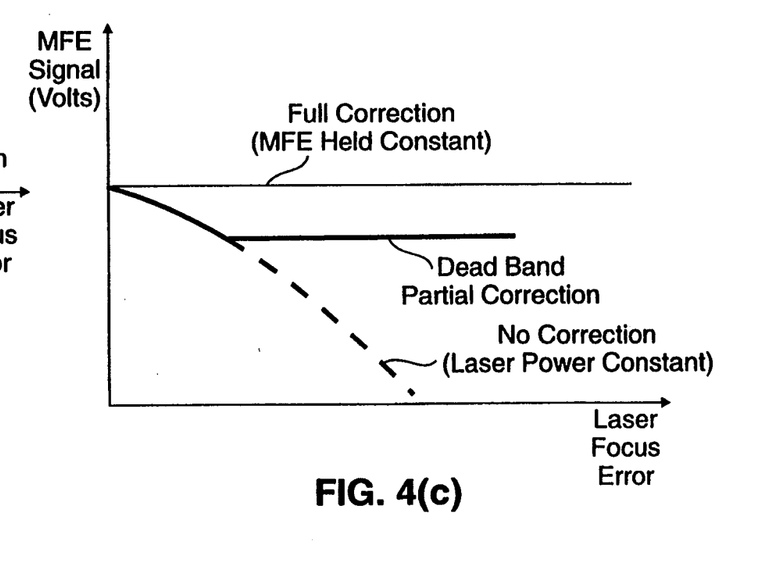
FIG. 4(c) is a plot of MFE signal variation as a function of laser focus error, illustrating deadband partial correction.

The solid portions of the curve in FIG. 4(a) correspond to an MFE signal which has been restricted to certain values. The area above the straight dotted line, corresponding to the voltage level $V_{DB}$, is referred to herein as a deadband, and the MFE signal may only take on values above $V_{DB}$. The deadband thus represents a predetermined range of values around the MFE target value in which there is no correction to MFE error. Although only a lower limit $V_{DB}$ is shown in FIG. 4(a), an upper limit on the MFE signal may also be included in an alternative embodiment. FIG. 4(b) illustrates an exemplary $\beta$ curve resulting from reading back data recorded using the above-described deadband partial correction technique. The upper dotted curve corresponds to prior art full correction techniques which maintain the MFE signal at a target value. The lower dotted curve corresponds to techniques which maintain a constant laser power, or provide no correction, in the presence of laser defocus. The solid curve shows the $\beta$ values which result when the MFE signal is restricted to values within the deadband. FIG. 4(c) shows the MFE signals as a function of laser defocus for full correction, deadband partial correction and no correction. For full correction, in accordance with prior art techniques, the MFE signal is held constant for all values of laser defocus. The lower dotted curve corresponds to the case of no correction, in which laser power is held constant. The solid curve represents MFE signals when a deadband partial correction is used, such that the MFE signals may not take on values below the deadband voltage limit $V_{DB}$.

Figure 5:
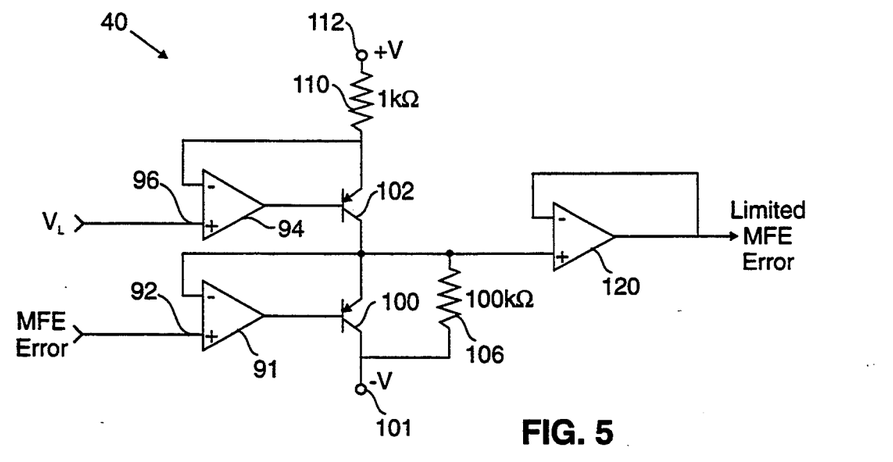
FIG. 5 is an exemplary voltage limiter suitable for use in the recording system of FIG. 1.

FIG. 5 is a schematic diagram of an exemplary voltage limiter 40 suitable for use in the optical recording system of FIG. 1. The voltage limiter 40 includes a first amplifier 91 having an error signal input 92 for receiving an input MFE error signal from the signal combiner 34. The limiter 40 also includes a second amplifier 94 for receiving, on its voltage limit input 96, a limiting voltage $V_L$ which establishes a maximum output voltage value for the limiter circuit 40. The first amplifier 91 drives a first p-n-p bipolar transistor 100. The transistor 100 has a collector connected to a negative voltage reference 101 and an emitter connected to a collector of a second p-n-p bipolar transistor 102 and to an inverting input of the first amplifier 91. A first resistor 106 is connected in parallel with the collector and emitter of the transistor 100. A second resistor 110 is connected between the emitter of the second transistor 102 and a positive voltage reference 112. The emitter of transistor 100 is also connected to a non-inverting input of a third amplifier 120. The first amplifier 92 is an AD847 op-amp available from Analog Devices, and the second and third amplifiers 96, 120 are TLC274 op-amps available from Texas Instruments. Suitable values for the resistors 106, 110 are 100 k and 1 k, respectively. In operation, the voltage limiter 40 in FIG. 5 passes the MFE error signal at its input 92 unaltered as long as the MFE error voltage is below or equal to $V_L$. If the MFE error signal rises above $V_L$, the limiter output is held at $V_L$. The circuit of FIG. 5 is only one of many voltage limiters which may be used to provide laser power control in accordance with the present invention.

Figure 6:
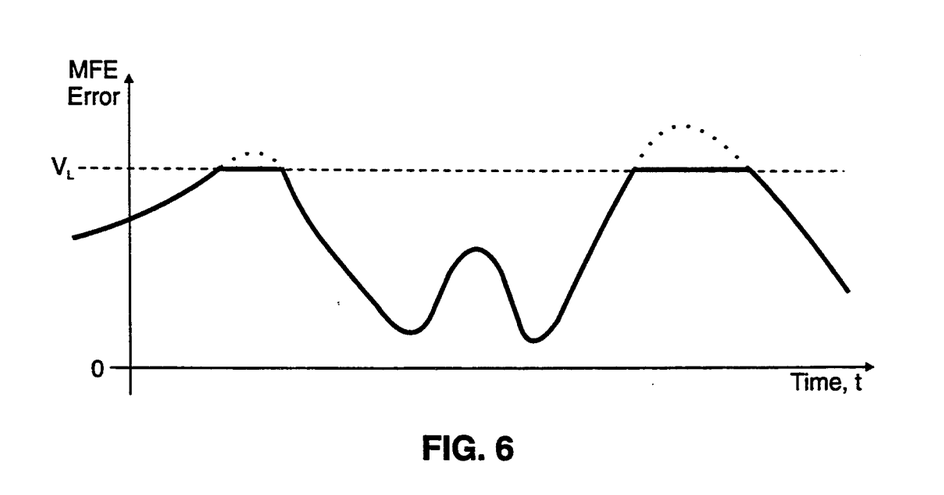
FIG. 6 is a plot of an exemplary MFE error signal as a function of time, illustrating the operation of the voltage limiter circuit of FIG. 5.

FIG. 6 more clearly illustrates the operation of the voltage limiter 40 shown in FIG. 6. A plot of an exemplary MFE error signal is shown. The dotted line portions of the curve represent the portions of the MFE error signal which exceed the voltage limit $V_L$. The solid line portions of the curve represent the portions of the MFE error signal which pass unaltered through the voltage limiter. The voltage limiter 40 has clipped two peaks of the MFE error signal which exceeded the voltage limit $V_L$.

An exemplary technique for limiting the write DAC voltage during, for example, operation of the servo loop in FIG. 1, will now be described. The maximum peak laser power will be referred to as $P_M$. $P_D$ refers to the actual power level which results when the write and read DAC voltages are supplied to, for example, a laser driver. It will be assumed herein that the read DAC voltage, which may be controlled by a servo operating on, for example, the FFM output voltage, always contributes a fixed amount of power to the total laser output power. The contribution to total laser power from the read DAC will be referred to herein as $P_R$. The variation in laser output power per unit change in input control voltage from, for example, the write DAC, will be referred to as K. K thus represents a voltage-power characteristic for the laser. In the exemplary case of a linear relationship of DAC voltage versus laser power, K is a constant and the power $P_D$ is then given by:

$$P_D = P_R + (K \times V_{DAC}),$$

in which $V_{DAC}$ is the variable control voltage from, for example, the write DAC. Solving for $V_{DAC}$ yields:

$$V_{DAC} = \frac{P_D - P_R}{K}$$

A limit on the variable control voltage $V_{DAC}$ is then given by:

$$V_{DAC} \leq \frac{P_M - P_R}{K}$$

The laser maximum output power $P_M$ will not be exceeded if the variable control voltage from the write DAC is maintained at or below the maximum $V_{DAC}$ value shown above.

After the maximum DAC voltage $V_{DAC}$ is determined, a limit for the MFE error signal may be determined. The difference between the maximum laser power $P_M$ and the actual power $P_D$ resulting from both the read and write DAC settings, will be referred to as the available power $P_A$. In general, the power $P_A$ represents the maximum amount of additional output power which may be contributed by the MFE error servo loop. The power contributed by the MFE error servo loop will be referred to as $P_{MFE}$, and is given by:

$$P_{MFE} = K \times V_{MFE} \times G_{MFE},$$

in which $V_{MFE}$ is the MFE error signal voltage, $G_{MFE}$ is the total gain of the MFE servo loop. $G_{MFE}$ includes the inverting effect of the signal combiner 68 in FIG. 1. The MFE error limit $V_L$ is then given by:

$$V_L = \frac{P_A}{K \times G_{MFE}}$$

The MFE error limit $V_L$ may also be expressed as:

$$V_L = \frac{P_M - P_R - (K \times V_{DAC})}{K \times G_{MFE}}$$

This error limit may be used in, for example, the voltage limiter 40 of FIG. 1 to limit the contribution of the MFE error servo loop to total laser power.

In the above-described techniques for determining maximum values for write DAC voltage and MFE error, it was assumed that the value K remained at a single constant value for the life of the recording system. As noted above, K represents the change in total laser output power for a given change in input control voltage, from, for example, the write DAC. The value of K thus corresponds to a voltage-power characteristic of the laser. As the laser ages or is operated in different environments, the laser current-power relationship may change. Laser power could be more accurately controlled if the value K were periodically updated to reflect these changes in the laser current-power relationship. The present invention uses the known FFM voltage to laser output power relation to update the value of K in order to provide, for example, more accurate limits on DAC and MFE error voltages. The FFM voltage as a function of laser output power may be measured, for example, during the recording system manufacturing process. In general, the FFM voltage provides an indication of laser output power which remains relatively stable over the lifetime of the optical recording system, as compared with the stability of the value K. The voltage-power relationship for the FFM is typically a linear relationship, and therefore may be estimated using two points of voltage and power. One technique for measuring this FFM relationship is to operate the laser with a write signal at a 50% duty cycle. The FFM voltage is then measured while monitoring the laser output power using an integrating sphere and a silicon photodiode, or other optical power measurement hardware. This measurement may be performed at, for example, laser output powers of about 5 milliwatts and 17 milliwatts. The first laser output power will be referred to herein as $P_L$ and the second as $P_H$, and the corresponding FFM voltages will be referred to as $FFM_L$ and $FFM_H$, respectively. These values are measured and stored in a system memory during, for example, an initial optical head calibration.

At various times during the system lifetime, the value K may be updated in the following manner. Initially, the write DAC is set to deliver a control voltage of zero to the laser driver. A 50% duty cycle data stream is used to modulate the laser. The write DAC is incremented one DAC count at a time, and the FFM voltage is read for each count. When the FFM voltage equals the stored value $FFM_L$, the corresponding DAC voltage, which will be referred to as $V_{DL}$, is stored. The write DAC count is then again incremented, one count at a time, until the FFM voltage equals the stored value $FFM_H$. The corresponding DAC voltage will be referred to as $V_{DH}$. A new value of K may then be determined as follows:

$$K = \frac{V_{DH} - V_{DL}}{P_H - P_L}.$$

The updated value of K will reflect any changes which have occurred in the laser current-power relationship since the last measurement of K. It should be noted that the above techniques could be extended in a straightforward manner to, for example, systems which include more than a single write power DAC, or to systems which utilize different hardware to control and monitor laser power. The FFM of the present invention may be any type of optical detector or other means capable of detecting the incident optical write signal and converting it to an electrical quantity.

An exemplary MFE signal which may be used to control laser power in accordance with the present invention will now be described. Additional detail may be found in the above-cited U.S. Patent application No. 08/179,472.

Figures 7A, 7B:
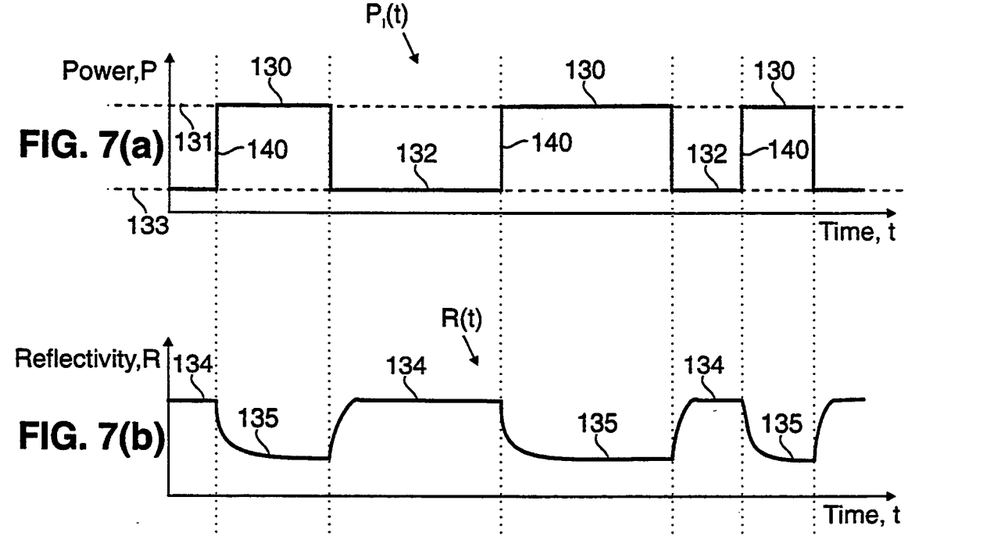
FIG. 7(a) shows an exemplary optical write signal, including several write pulses, which may be incident on an optical recording medium.
FIG. 7(b) shows exemplary changes in reflectivity of an optical recording medium in response to the incident write signal of FIG. 7(a).

FIG. 7(a) shows a graph of power, P, versus time, t, for an exemplary incident optical write signal waveform $P_I(t)$, which is generated by the optical source 11 and which will be incident on the recording medium 14 during writing. The incident optical write signal $P_I(t)$ includes a number of write pulses 130 at a write power level 131. In this embodiment, in which marks represent areas of reduced reflectivity, the write power level 131 is a power level sufficient to raise the temperature of the optical recording medium 14 such that marks are formed thereon during write pulses 130. The write pulses 130 correspond to a high logic level of the recording data which intensity-modulates the optical source 11. The write signal also includes a number of intervals 132 at a lower power level 133, corresponding to a low logic level of the recording data. The lower power level 133 is a power level which is not sufficient to alter the reflectivity of the medium, and may suitably be a read power level such that, for example, high-frequency wobble and tracking error information can be read from the medium during the intervals 132. In other embodiments, the optical source could be turned off between write pulses, such that the lower power level 133 is a zero light intensity level.

FIG. 7(b) shows a waveform, R(t), which illustrates the changes in reflectivity R(t) of an optical recording medium as a function of time, resulting from writing on the medium with the incident optical write signal $P_I(t)$ of FIG. 7(a). The changes in the waveform R(t) illustrate the response of a "burn dark" optical recording medium, in which a mark is an area of reduced reflectivity. The medium reflectivity declines from a high reflectivity value 134 to a low reflectivity value 135 during the course of a write pulse 130. The reflectivity declines in this manner due to, for example, the recording medium temperature increase and resultant marking of the medium caused by an incident write pulse 130.

Figure 7C:
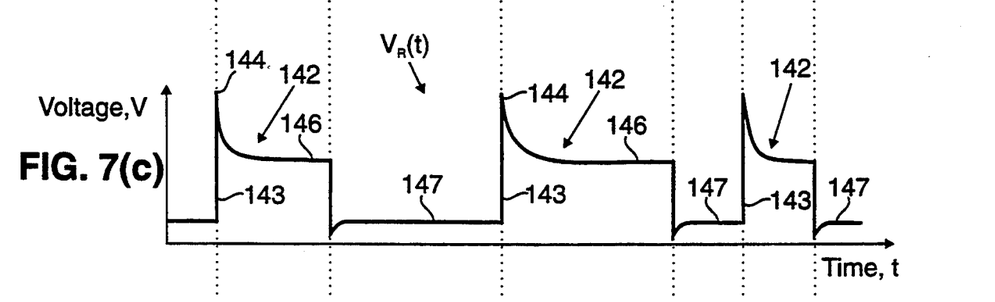
FIG. 7(c) shows an exemplary reflected write signal, reflected from an optical recording medium with the reflectivity shown in FIG. 7(b).

The changes in medium reflectivity shown in FIG. 7(b) produce the exemplary reflected write signal $V_R(t)$ of FIG. 7(c). The reflected write signal $V_R(t)$ includes a number of reflected write pulses 142, generally corresponding to the incident write pulses 130 in FIG. 7(a). The exemplary reflected pulses 142 within the reflected write signal of FIG. 7(c) are characteristic of certain types of optical media. For example, an absorptive dye-based optical recording media will reflect write pulses similar to the reflected pulses 142 in response to the incident write signal of FIG. 7(a). The voltage level of each reflected write pulse 142 declines from a peak voltage 144 coinciding with the rising edge 140 of the incident write pulse 130, to a steady-state plateau voltage 146 after the onset of mark formation. The reflected write pulses 42 each include a rising edge 143. Although the reflected write pulses 142 are shown in FIG. 7(c) as having a sharp, instantaneous rising edge for illustrative purposes, it should be understood that actual reflected pulses may have a more gradual rising edge.

One embodiment of the present invention utilizes the decay rate of the reflected write pulse, from a first voltage at or below the peak voltage 144 to a second voltage which may exceed the plateau voltage 146, to indicate proper formation of a mark on the optical medium. Although the reflected pulse decay rate is generally illustrated herein as a voltage function, the reflected pulse decay rate could also be shown in terms of other parameters, such as current, power or intensity.

To summarize, at the rising edge 140 of the incident pulse 30, the reflectivity of the medium 14 remains high before the onset of mark formation, and therefore the reflected pulse voltage 144 is at a maximum. As the incident pulse 130 begins to reduce the reflectivity of the medium during the onset of mark formation, the magnitude of the reflected write pulse declines toward the lower plateau voltage 146. During the time intervals 132 in which the incident write signal is at the lower power level 133, the reflected write signal is also at a lower level 147.

Figure 8:
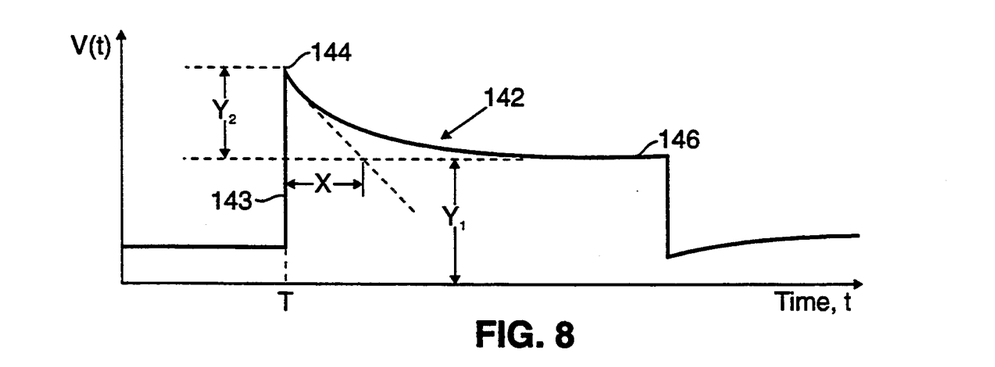
FIG. 8 shows a decaying portion of an exemplary reflected pulse estimated as an exponential function.

FIG. 8 shows a single reflected write pulse 142 in greater detail. In general, the rate of change of each of the reflected write pulses 142 may be estimated by an exponential function, as shown in FIG. 8. The exemplary exponential function in FIG. 8 represents the decaying portion of one of the reflected write pulses 142 in terms of voltage as a function of time. The exponential function may be expressed as:

$$V_P(t) = Y_1 + Y_2(\exp(-(t-T)/X)).$$

In the above exponential function, t is time, Vp(t) is the reflected pulse voltage, $Y_1$ is the steady-state plateau voltage 146, $Y_2$ is the voltage difference between the peak voltage 144 and the steady-state plateau voltage 146, T is the arrival time of the rising edge, and X is the difference between the time T and the time at which a line tangent to the initial rate of decay crosses the plateau voltage level. The exponential function may be used, in accordance with the present invention, to estimate the decay rate of the reflected write pulses.

Figure 9A:
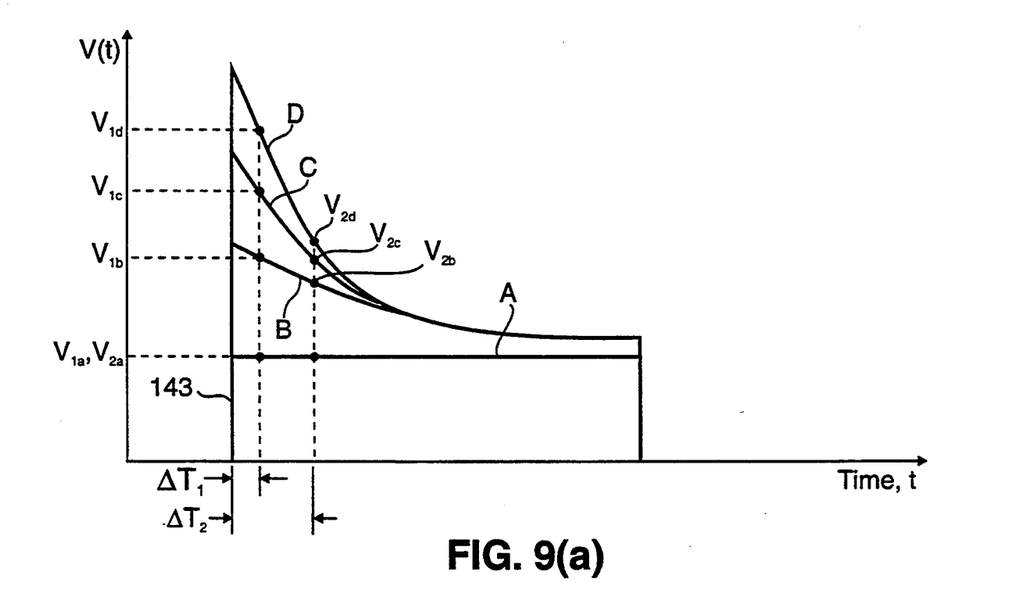
FIG. 9(a) shows four exemplary superimposed reflected write pulses, at various incident write signal power levels.

FIG. 9(a) shows several superimposed reflected write pulses with different decay rates. The exemplary reflected write pulses A, B, C and D correspond to electrical signals at the output of the optical detector 19, and are therefore shown in terms of voltage as a function of time. For illustrative purposes, only the portions of the pulses above a read level, corresponding to the level 147 in FIG. 7(c), are shown. The reflected write pulses A, B, C and D in FIG. 9(a) each result from an incident write pulse at a different write signal power level, with the incident write power level generally increasing from a level insufficient to form a mark, corresponding to reflected pulse A, to a level above an optimal mark formation power level, corresponding to reflected pulse D. The reflected pulse C corresponds to the optimal incident write power. Because no mark is formed by the incident write pulse giving rise to reflected write pulse A, there is no change in the reflectivity of the medium, and therefore the reflected pulse amplitude remains constant for the duration of the incident pulse. The peak voltages and decay rates for each of the reflected pulses B, C and D are different because each pulse is a reflection of an incident write pulse at a different power level.

Figure 9B:
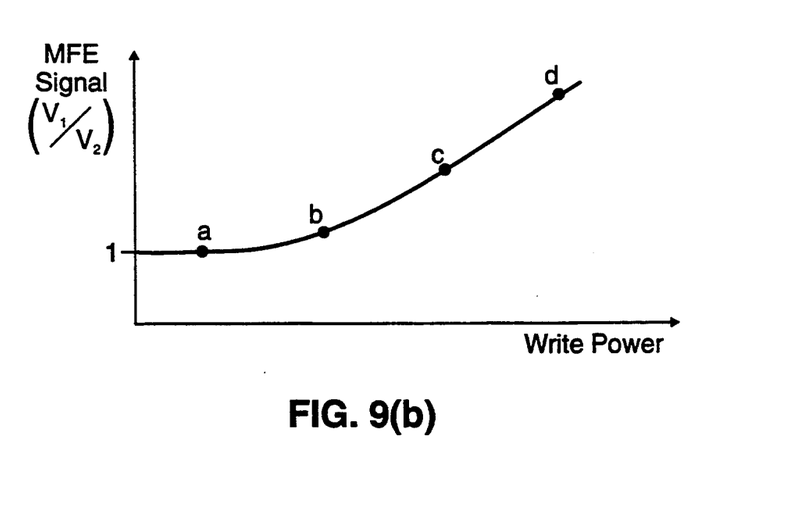
FIG. 9(b) is a plot showing exemplary MFE signals generated in accordance with the present invention for each of the reflected write pulses of FIG. 9(a).

FIG. 9(b) shows a number of plotted points a, b, c and d. The points a, b, c and d are referred to herein as MFE signals, and represent estimated normalized decay rates for each of the four reflected write pulses of FIG. 9(a). By dividing a first reflected pulse voltage by a second reflected pulse voltage to estimate a decay rate, the MFE signal is normalized to the reflected pulse, and therefore insensitive to the above-discussed effects, such as media contaminations and imperfections, which alter the reflected signal magnitude. The MFE signal a for the reflected pulse A is computed by dividing a first voltage $V_{1a}$ by a second voltage $V_{2a}$, as shown in FIG. 9(a). In this embodiment, the first and second voltages are measured at a first and a second predetermined time, $\Delta T_1$ and $\Delta T_2$, respectively, after the rising edge 43 of the reflected pulse. The MFE signal a for pulse A has a value of one. As will be discussed below, an estimated decay rate value of zero, equivalent to the actual decay rate, could be obtained for pulse A by using a linear transformation of the quotient $V_{1a}/V_{2a}$. However, an estimated decay rate value of one for an actual decay rate of zero still provides a reliable indication that no mark has been formed, while properly formed marks have MFE signal values significantly greater than one.

The second exemplary reflected pulse B corresponds to an incident write pulse power level greater than that of pulse A, but below the optimal write power level corresponding to pulse C. The incident power level which gives rise to reflected pulse B causes some change in the reflectivity of the medium, but may be insufficient to properly form a mark. An estimated normalized decay rate corresponding to point b in FIG. 9(b) may be determined by measuring the quotient $V_{1b}/V_{2b}$. As noted above, the third reflected pulse C results from an incident pulse at an optimal write power. An estimated normalized decay rate corresponding to point c in FIG. 9(b) is determined for pulse C by dividing the voltages $V_{1c}$ and $V_{2c}$. Although these two voltage points are measured at the same predetermined time points, $\Delta T_1$ and $\Delta T_2$, used to estimate decay rates for pulses A and B, the quotient of the voltages is larger because reflected pulse C has a faster normalized decay rate. The fourth pulse D corresponds to an incident write pulse power level above the optimal write power level. An estimated normalized decay rate corresponding to point d in FIG. 9(b) is determined for the reflected pulse D by measuring the quotient $V_{1d}/V_{2d}$. The decay rate d is faster than the decay rates a, b and c of the exemplary pulses A, B and C. With the incident write pulse power level corresponding to reflected pulse D, a mark is formed very rapidly on the recording medium, and the change in reflectivity is also rapid, resulting in a faster normalized decay rate. Although in this exemplary embodiment both of the predetermined times $\Delta T_1$ and $\Delta T_2$ are shown relative to the rising edge 143 of the reflected pulse 142, the MFE signals in accordance with the present invention do not require precise reference pulse timing relative to the reflected pulse rising edge.

As noted above, FIG. 9(b) is a plot of the MFE signals a, b, c and d corresponding to estimated normalized decay rates obtained for each of the reflected pulses A, B, C, and D. From FIG. 9(b) it can be seen that the MFE signals of the reflected pulses increase as a function of increasing incident write power. The plotted points a, b, c, and d correspond to the estimated normalized decay rates of the reflected signal pulses A, B, C and D, respectively, and are arranged in order of increasing incident write signal power. With increasing incident write signal power, the estimated normalized decay rate increases, indicating an increase in the rate at which a mark is formed on the optical medium.

Alternative MFE signals may be used to estimate the normalized decay rate of the reflected pulse signals. For example, a linear or non-linear transformation of the quotient $V_1/V_2$ may be used as an MFE signal. One such linear transformation could be performed using the equation:

$$((V_1/V_2)-1)/((V_1/V_2)+1)$$

This linear transformation of the quotient $V_1/V_2$ provides the same amount of normalized decay rate information as the quotient, but when plotted will have a different vertical axis intercept than the plot shown in FIG. 9(b). If the voltage $V_1$ equals the voltage $V_2$, as was the case for the exemplary reflected pulse A in FIG. 9(a), the above linear transformation will produce an estimated normalized decay rate of zero, which is equivalent to the actual normalized decay rate. It may be useful in some applications to have a zero MFE signal value for the condition $V_1$ equal to $V_2$. Other linear or non-linear transformations of the quotient $V_1/V_2$ could also be used. In addition, measurements other than the quotient $V_1/V_2$, as well as transformations of these other measurements, could be used to estimate the normalized decay rate. Other characteristics of the reflected write pulse indicative of mark formation quality could also be used as MFE signals herein.

It should be noted that although the reflected write pulses shown in FIGS. 7 through 9 exhibit a decay rate characteristic common to certain types of "burn dark" media, the techniques of the present invention could also be used with other types of recording media with different rate of change characteristics. For example, the present invention could be used with "burn bright" types of optical media, in which an increase in reflectivity occurs during mark formation, such that the reflected pulse voltage increases rather than decays as the mark is formed. Despite such changes in the direction or shape of the reflected pulse rate of change, the rate of change may still be estimated using an MFE signal in accordance with the present invention.

Although the reflected pulse decay rate is generally a function of the type of recording medium, the exact times at which the reflected pulse voltage should be measured may depend, in part, on the write speed of the recording system. In systems operating at write speeds of 6×, which is six times the standard 4.32 Mbits/sec audio CD playback speed, or 25.92 Mbits/sec, the first predetermined time at which the first voltage point is measured may be about 10 nanoseconds after the reflected pulse rising edge 143. The second predetermined time, at which the second voltage used in the MFE signal generation is measured, may be about 30 nanoseconds after the rising edge 143. The measurement times will typically vary for different optical write speeds, and may also be modified in a straightforward manner to accommodate the different rates of change associated with other types of optical media.

Figure 10:
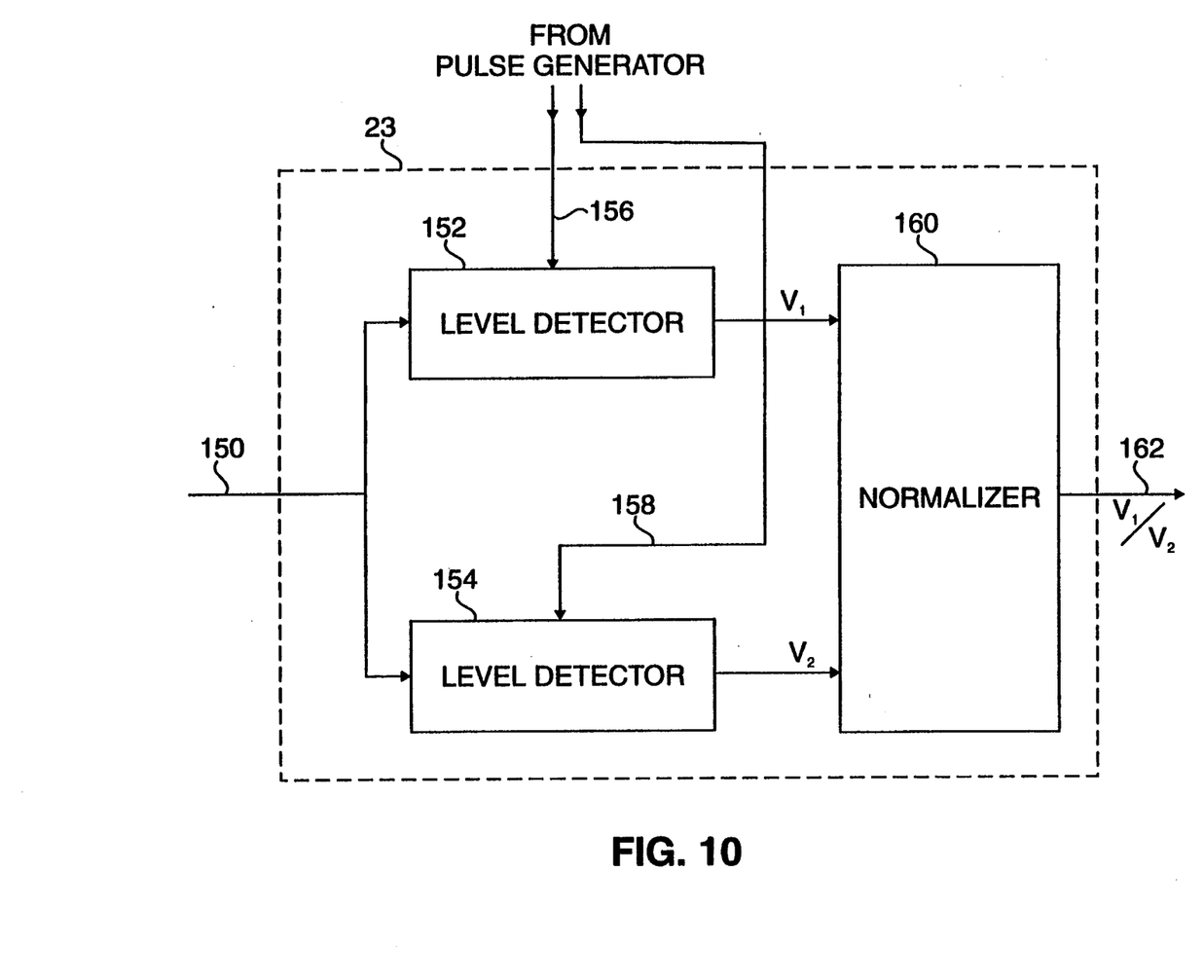
FIG. 10 is a block diagram of an exemplary MFE signal generator suitable for use with the present invention.

FIG. 10 is a block diagram of an exemplary MFE signal generator 123 suitable for use with the present invention. The MFE signal generator 123 operates to measure the voltages $V_1$ and $V_2$ of FIG. 9(a) and to perform a normalization step by, for example, dividing $V_1$ by $V_2$. The exemplary MFE signal generator 123 includes a reflected write signal input 150, a first level detector 152, and a second level detector 154. Reference pulse generator 27 in FIG. 1 provides a first reference pulse signal, with pulses of a first predetermined time duration $\Delta T_1$, to a reference pulse input 156 of the first level detector 152. Reference pulse generator 27 also provides a second reference pulse signal, with pulses of a second predetermined time duration $\Delta T_2$, to a reference pulse input 158 of the second level detector 154. Alternatively, separate reference pulse generators for each of the level detectors could be incorporated into the MFE signal generator 23. A reflected write signal is supplied on input 150 and thereby to both first and second level detectors 152, 154. The predetermined times $\Delta T_1$ and $\Delta T_2$ represent periods of time for which the reflected write pulse voltage remains above a first and second voltage threshold, respectively. The level detectors 152, 154 measure the first and second voltages at the predetermined times. The first level detector 152 detects first voltage $V_1$ while the second level detector detects second voltage $V_2$. These voltages may correspond, for example, to the first and second voltage levels shown for the exemplary optimal power reflected pulse C in FIG. 9(a). The first and second measured voltages are then supplied to a normalizer circuit 160. The normalizer circuit estimates a normalized decay rate of the reflected pulse by, for example, dividing the first voltage $V_1$ by the second voltage $V_2$. The output 162 of the normalizer circuit 160 may therefore be the quotient $V_1/V_2$, described in conjunction with FIGS. 8 and 9 above. Additional detail regarding exemplary embodiments of level detectors 152, 154, and alternative embodiments for the MFE signal generator 123, are described in U.S. Patent application No. 08/179,472.

An alternative MFE signal suitable for use in the present invention is an integral of the area under the reflected pulse from, for example, the pulse rising edge 143 to a predetermined measurement time $T_N$ after the rising edge. The integrated pulses may be normalized to the reflected signal magnitude by dividing the result of the integration by, for example, the reflected pulse voltage at time $T_N$.

Although the foregoing detailed description has described the present invention primarily in terms of an illustrative optical recording system and method, it should be understood that the embodiments discussed are exemplary only. Many variations may be made in the arrangements shown, including, for example, the type of MFE signal used to control laser power, the type of optical recording medium and the particular implementation of partial MFE error correction. These and other alternatives and variations will be readily apparent to those skilled in the art, and the present invention is therefore limited only by the appended claims.

| | Parts List |
|---|---|
| 10 | optical head |
| 11 | optical source |
| 14 | optical medium |
| 19 | optical detector |
| 23 | MFE signal generator |
| 27 | pulse generator |
| 28 | data source |
| 30 | front facet monitor (FFM) |
| 32 | recording system processor |
| 34 | signal combiner |
| 36 | recording system memory |
| 40 | voltage limiter |
| 50 | servo loop feedback circuit |
| 60 | variable gain stage |
| 62 | fixed gain stage |
| 64 | loop switch |
| 66 | write power DAC |
| 68 | signal combiner |
| 70 | write laser driver |
| 72 | read power DAC |
| 74 | read laser driver |
| 91 | first amplifier |
| 92 | error signal input |
| 94 | second amplifier |
| 96 | voltage limit input |
| 100 | first transistor |
| 101 | negative voltage reference |
| 102 | second transistor |
| 106 | first resistor |
| 110 | second resistor |
| 112 | positive voltage reference |
| 120 | third amplifier |
| 130 | incident write pulse |
| 131 | write power level |
| 132 | write signal intervals |
| 133 | lower power level |
| 134 | high reflectivity value |
| 135 | low reflectivity value |
| 140 | incident write pulse rising edge |
| 142 | reflected write pulse |
| 143 | reflected write pulse rising edge |
| 144 | reflected write pulse peak voltage |
| 146 | reflected write pulse plateau voltage |
| 150 | reflected write signal input |
| 152 | first level detector |
| 154 | second level detector |
| 156 | reference pulse input |
| 158 | reference pulse input |
| 160 | normalizer circuit |
| 162 | normalizer circuit output |
| A, B, C, D | reflected write pulses |
| a, b, c, d | MFE signals |
| $A_+$ | positive readback peak voltage |
| $A_-$ | negative readback mark voltage |
| $FFM_H$ | first FFM voltage |
| $FFM_L$ | second FFM voltage |
| G | total open loop gain |
| G1 | media response |
| G2 | variable gain |
| $1/(1 + G)$ | residual error |
| $G_{MFE}$ | MFE servo loop gain |
| K | laser voltage-power characteristic |
| $MFE_C$ | closed loop MFE error |
| $MFE_O$ | open loop MFE error |
| P | power |
| $P_I(t)$ | incident optical write signal |
| $P_A$ | available laser output power |
| $P_D$ | actual laser output power |
| $P_H$ | first laser output power |
| $P_L$ | second laser output power |
| $P_M$ | maximum laser output power |
| $P_{MFE}$ | MFE servo loop power |
| $P_R$ | read power |
| $P_{RB}(t)$ | read back signal |

-continued

| Parts List | |
|---|---|
| R | reflectivity |
| R(t) | reflectivity waveform |
| t,T | time |
| $T_N$ | measurement time |
| $V_1, V_{1a}, V_{1b}, V_{1c}, V_{1d}$ | first reflected pulse voltage |
| $V_2, V_{2a}, V_{2b}, V_{2a}, V_{2d}$ | second reflected pulse voltage |
| $V_{DAC}$ | variable DAC control voltage |
| $V_{DB}$ | minimum deadband voltage |
| $V_{DH}$ | first DAC voltage |
| $V_{DL}$ | second DAC voltage |
| $V_L$ | MFE error signal voltage limit |
| $V_P(t)$ | reflected pulse voltage |
| $V_R(t)$ | reflected write signal |
| X | exponential function constant |
| $Y_1$ | plateau voltage |
| $Y_2$ | peak to plateau voltage difference |
| $\beta$ | readback signal beta |
| $\Delta T_1$ | first predetermined time |
| $\Delta T_2$ | second predetermined time |

What is claimed is:

1. An optical recording system for recording data on an optical recording medium, said system comprising:
    an optical source for supplying to said medium an incident write signal, said incident write signal including at least one incident write pulse, such that a logic level of said data may be recorded on said medium during said pulse as a mark having a distinct reflectivity;
    means for detecting a reflection of said incident write signal from said medium to provide a reflected write signal, said reflected write signal including a reflected write pulse corresponding to said incident write pulse;
    means for generating a mark formation effectiveness signal from said reflected write pulse, said mark formation effectiveness signal generator providing an indication of the quality of said mark;
    means for generating an error signal from said mark formation effectiveness signal and a target value of said mark formation effectiveness signal; and
    means for controlling a write power level of said optical source by providing a partial correction of variation in said error signal.

2. The system of claim 1 wherein said variation in said error signal results from a focus error of said optical source.

3. The system of claim 1 wherein said variation in said error signal results from a tilt of said optical medium in said recording system.

4. The system of claim 1 wherein said means for controlling said laser power by providing a partial correction of said variation in said error signal includes restricting said mark formation effectiveness signal to values within a predetermined range.

5. The system of claim 1 wherein said means for controlling said laser power by providing a partial correction of said error signal includes a servo loop.

6. The system of claim 5 wherein said servo loop is variable gain servo loop having a variable gain stage for receiving said error signal from said error signal generating means and providing a variable amount of amplification for said error signal.

7. The system of claim 5 wherein said servo loop further includes:
    a fixed gain stage for amplifying said error signal;
    a variable gain stage for varying a magnitude of said error signal; and
    a loop switch for providing said error signal to said optical source during normal operation of said recording system, and disconnecting said error signal from said loop during a calibration of said target value of said mark formation effectiveness signal.

8. The system of claim 7 wherein said variable gain stage includes a multiplying digital-to-analog convertor.

9. The system of claim 7 wherein said variable gain stage includes a variable attenuator.

10. The system of claim 5 wherein said servo loop has a variable gain which is determined by measuring a media response of a signal path including said optical source, said optical medium, said means for detecting said reflected signal, and said means for generating a mark formation effectiveness signal.

11. The system of claim 1 further including a voltage limiter for limiting a voltage level of said error signal in order to prevent said optical source from exceeding a maximum output power.

12. The system of claim 1 further including means for detecting said incident write signal, said means providing a voltage which varies with an output power level of said optical source.

13. The system of claim 1 wherein a voltage value from said incident write signal detecting means corresponding to a particular optical source output power is stored in a system memory.

14. A method of recording data on an optical recording medium, said method comprising:
    supplying an incident write signal to said medium from an optical source, said incident write signal including at least one incident write pulse, such that a logic level of said data may be recorded on said medium during said pulse as a mark having a distinct reflectivity;
    detecting a reflection of said incident write signal from said medium to provide a reflected write signal, said reflected write signal including a reflected write pulse corresponding to said incident write pulse;
    generating a mark formation effectiveness signal from said reflected write pulse, said mark formation effectiveness signal generator providing an indication of the quality of said mark;
    generating an error signal from said mark formation effectiveness signal and a target value of said mark formation effectiveness signal; and
    controlling a write power level of said optical source by providing a partial correction of variation in said error signal.

15. The method of claim 14 wherein said variation in said error signal results from a focus error of said optical source.

16. The method of claim 14 wherein said variation in said error signal results from a tilt of said optical medium in said recording system.

17. The method of claim 14 wherein said step of controlling said laser power by providing a partial correction of said variation in said error signal includes restricting said mark formation effectiveness signal to values within a predetermined range.

18. The method of claim 14 wherein said step of controlling said laser power by providing a partial correction of said error signal includes providing a servo loop having a variable gain which is determined by measuring a media response of a signal path including said optical source, said optical medium, said means for detecting said reflected signal, and said means for generating a mark formation effectiveness signal.

19. The method of claim 14 further including the step of providing a voltage limiter for limiting a voltage level of said error signal in order to prevent said optical source from exceeding a maximum output power.

20. The method of claim 14 further including the steps of:
    detecting said incident write signal to providing a detected voltage which varies with an output power level of said optical source; and
    storing in a system memory a detected voltage value corresponding to a particular optical source output power such that a voltage-power characteristic of said optical source may be updated periodically.

* * * * *